(No Model.)

J. SCHINNELLER.
JOINT FOR GAS CONDUITS.

No. 376,917. Patented Jan. 24, 1888.

United States Patent Office.

JACOB SCHINNELLER, OF PITTSBURG, PENNSYLVANIA.

JOINT FOR GAS-CONDUITS.

SPECIFICATION forming part of Letters Patent No. 376,917, dated January 24, 1888.

Application filed July 23, 1887. Serial No. 215,120. (No model.)

*To all whom it may concern:*

Be it known that I, JACOB SCHINNELLER, a citizen of the United States, residing at Pittsburg, in the county of Allegheny and State of Pennsylvania, have invented certain new and useful Improvements in Joints for Gas-Conduits; and I do hereby declare the following to be a full, clear, and exact description of the invention, reference being had to the accompanying drawings, which form part of this specification.

This invention has relation to joints or couplings for the pipes and conduits designed and adapted for the conveyance of natural gas.

The object of this invention is to provide a coupling which will not only produce a very close and impenetrable joint when first laid, but which will allow for the expansion and contraction of the conduit-sections in the direction of their length and will permit the coupled sections to get out of alignment or move without in any way impairing the integrity of the joint or disturbing the proper arrangements of its parts.

The couplings heretofore employed in systems for conveyance of gas are, as a general rule, very efficient when first applied, and under normal conditions will maintain the joint and seams gas-tight. When, however, the pipes begin to elongate or contract under differences of temperature, or the sections lose alignment, or the coupling parts are in any way disturbed, the seam will open and allow more or less gas to escape. Hence it has been found necessary to incase the joints of natural-gas pipes in boxes provided with escape-pipes to take up and convey to and above the surface any gas leaking from the joints.

My invention consists in the provision of coupling appliances or a coupling wherein the ends of the sections are separated a short distance and are free to expand and contract in the direction of their length, and also wherein the sections may sag or get out of alignment in any direction without impairing the strength or tightness of the joint and without binding the parts of the joint or sections at their points of contact with or impingement against each other.

My invention furthermore consists in the novel construction, combination, and arrangement of parts, more fully described hereinafter, and specifically pointed out in the claim.

Figure 1:
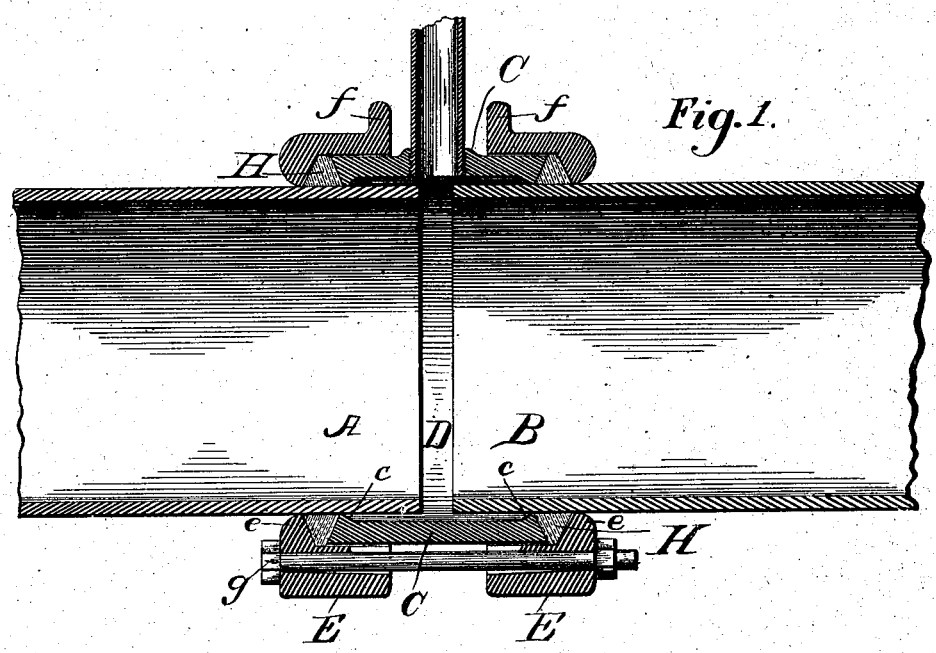
Figure 2:
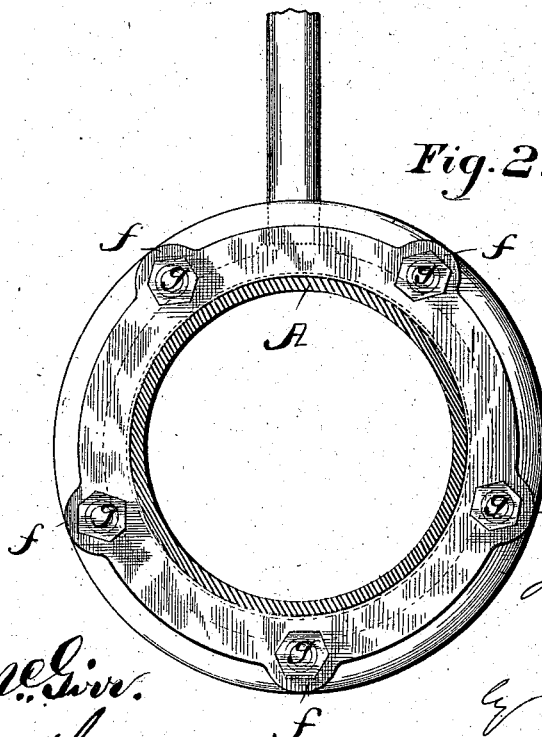

Referring to the accompanying drawings, Figure 1 is a sectional view of the coupling applied to two pipes, and Fig. 2 an end view of the same.

A B designate the adjacent pipe-sections, having their ends inserted within the sleeve C, which is of such a size as to fit the pipe closely around the ends of the same and has its interior slightly enlarged, as shown at D, to permit of a certain amount of movement of the pipe ends out of alignment. The sleeve C is beveled or curved at its ends, as shown at *c c*, the purpose of which will be explained more fully.

E E designate two sleeves or rings having flanges *e e*, beveled or curved on their inside faces and beveled or rounded on their outer ends to permit the pipes to sag or get out of alignment. These sleeves are provided with ears or lugs *f f*, having holes for the passage of the bolts *g g*. These holes are made larger than the diameter of the bolts and are tapered to permit of play.

H H are elastic rings or gaskets, the sides of which are made to fit the ends of the sleeve, and to fit within the spaces formed between the inner faces of the rings E E and the outside edges of the collar C. The inside diameter of the rings is made somewhat smaller than the outside diameter of the pipe, so that when expanded or stretched to fit over the pipe said rings will hug the pipe closely.

It will be seen that when the adjacent ends of the conduit-section are placed within the collar C and the elastic rings H H and flanged rings E E are in position the bolts *g g* will draw the two rings C C toward one another and compress the elastic rings H H, forming a perfect joint between the lower or inner sides of the elastic rings and the outer surface of the conduit-sections, and on account of the elasticity of the rings a certain amount of play of the sections will not impair the tightness of the joints. Whether this movement be caused by expansion or contraction of the metal or by settling of the pipe, as shown in the drawings, there is sufficient space between the rings or collars E E to permit the exit-pipe to be tapped into the collar A, and in practice this is found to be a very desirable point at which to tap the conduit for service-pipes.

As will be understood, I use plain or unthreaded pipe in the practice of my invention, and hence am able to save material and expense, as I can employ pipe of the least thickness necessary to withstand strain and pressure. When a joint requires threaded pipe, it is necessary to use pipe of extra thickness to allow of threads being cut without too much weakness of the pipe ends.

A joint or coupling constructed and applied according to my invention can be readily taken apart for repairs or examination or for making connections with branches or other lines, and as readily put together again when required.

It is an economical joint, as the principal parts are simply castings, which can be adjusted and tightened or loosened to fit in position.

There is little or no danger of the joint getting out of order or of the parts binding, special provision having been made to prevent binding under the lateral movement of the sections or parts of the coupling by reducing the contacting-surface of the collar metal rings to a very narrow limit or width and by beveling or rounding the surfaces to allow for play or movement of the sections out of line.

What I claim as new is—

In a pipe-coupling, the combination, with adjacent sections A B and sleeve C, embracing said sections and bearing thereon only at its edges c c, of the packing H, and the sleeves E E, embracing the packing and internally and externally beveled, so as to present edges e e to the pipe-sections, substantially as described.

In testimony that I claim the foregoing I have hereunto set my hand this 20th day of July, 1887.

JACOB SCHINNELLER.

Witnesses:
LOUIS MOESER,
IG. STAUFFER.